March 22, 1966 W. L. KING 3,241,642
CONSTANT OUTPUT SPEED COUPLING
Filed Dec. 27, 1960 2 Sheets-Sheet 2
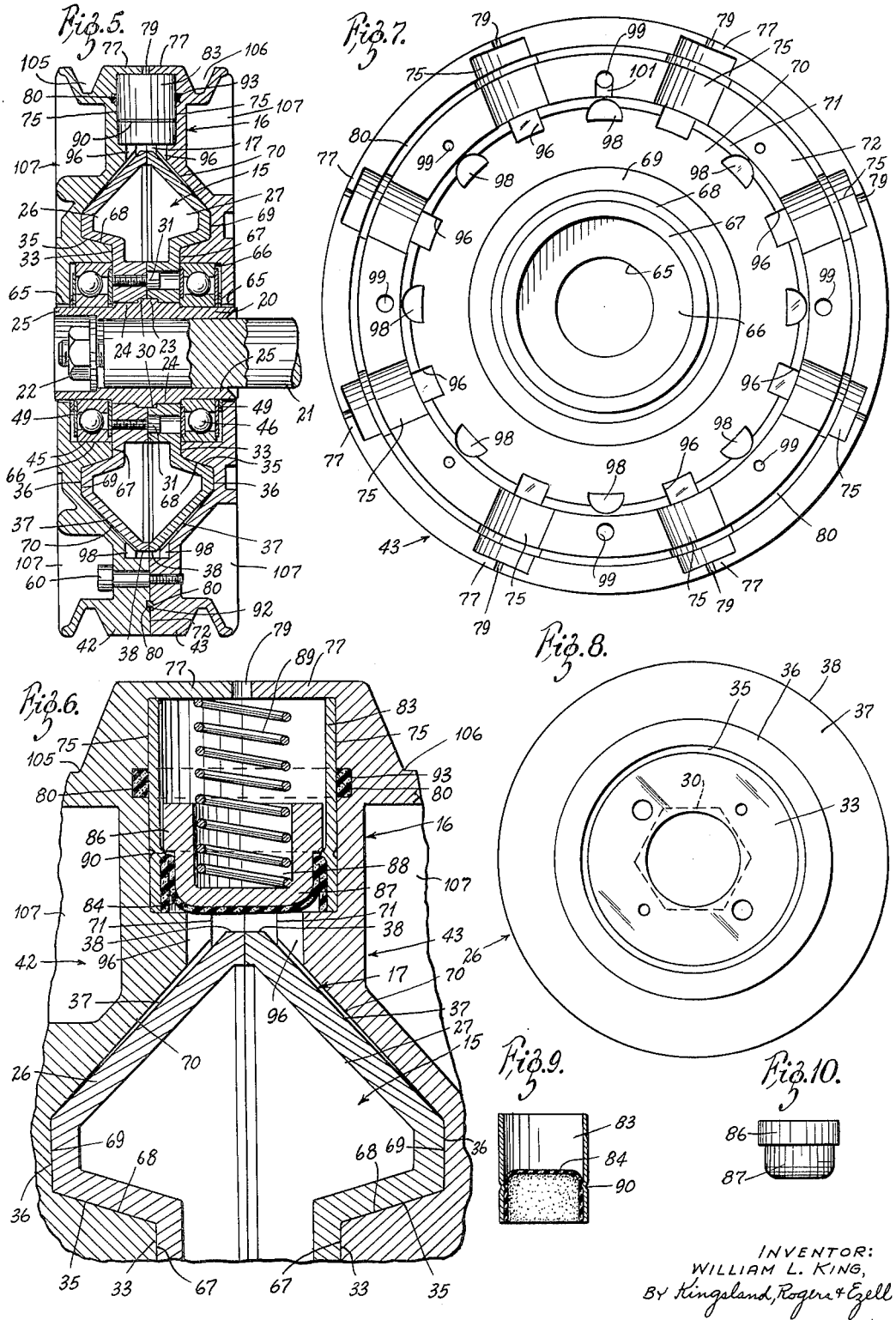
INVENTOR:
WILLIAM L. KING,
BY Kingsland, Rogers & Ezell
ATTORNEYS United States Patent Office 3,241,642
Patented Mar. 22, 1966

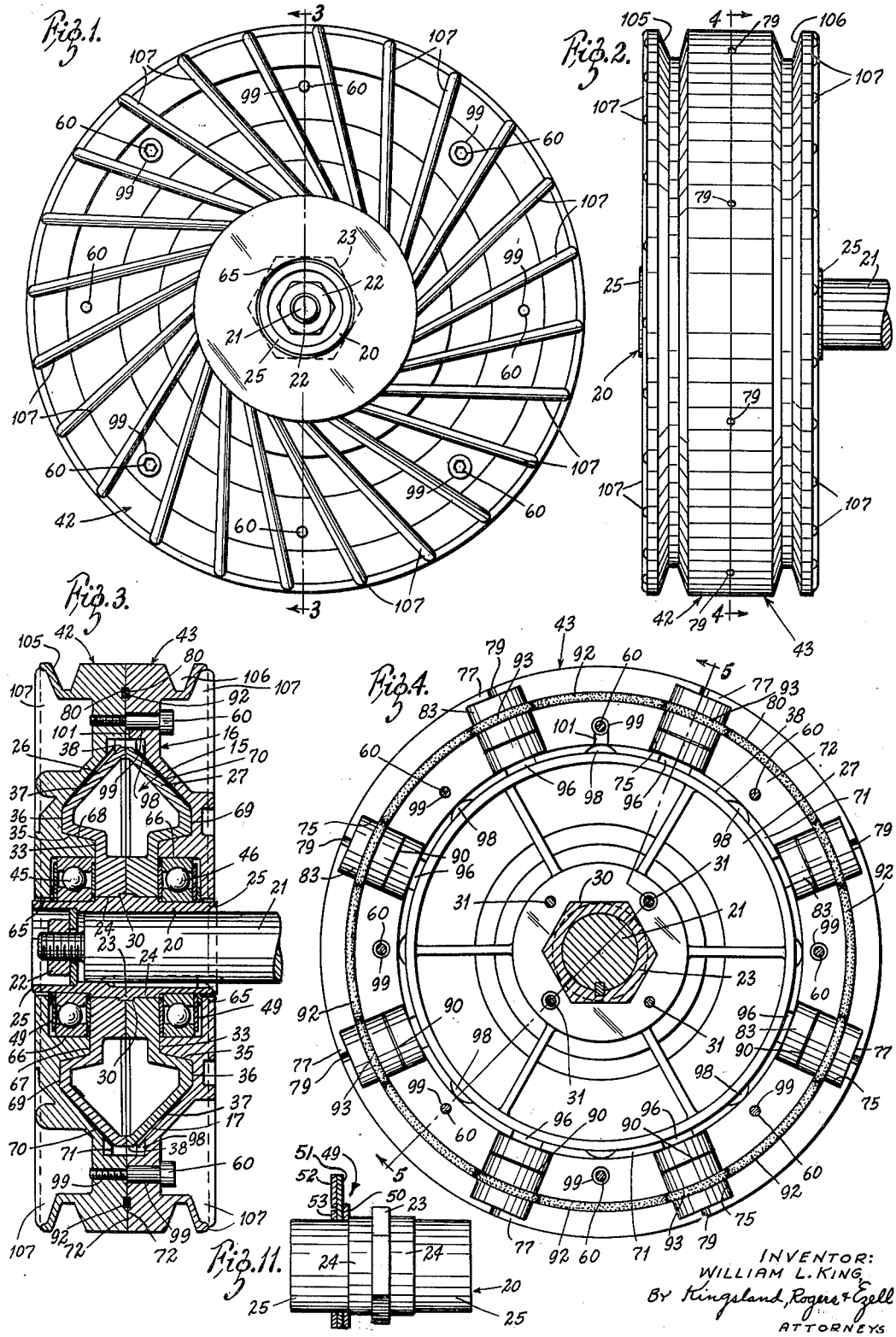

3,241,642
CONSTANT OUTPUT SPEED COUPLING
William L. King, Springfield, Oreg., assignor, by mesne assignments, to Nathan E. Knecht, Springfield, Oreg.
Filed Dec. 27, 1960, Ser. No. 78,617
7 Claims. (Cl. 192—58)

This present application is a continuation-in-part of the former application No. 801,339, filed by applicant March 23, 1959, for Fluid Shear Type Automatic Speed Control Coupling, now abandoned.

The present invention relates to constant output speed coupling having a rotary driving element, a rotary driven element, and a certain type of viscous liquid between them to cause the driven element to rotate with the driving element at all low speeds up to a certain critical output speed of the driven element, and thereafter to maintain a constant output speed regardless of the speed of the driving element above the critical speed.

In the illustrated embodiment, this invention comprises a driving element, or rotor, housed within a driven element. The two elements have closely spaced surfaces, or interfaces, of similar shape, preferably frusto-conical and preferably smooth. Between the two there is a confined liquid space that contains a viscous silicone oil of viscosity from about 10,000 to 1,000,000 or more centistokes. The driven element contains certain liquid relief spaces radially outward from the rim of the driving rotor. These spaces have pistons spring-urged radially inwardly. The driving rotor acts upon the viscous liquid, which transmits the torque to the driven element, causing it to rotate. The interfaces of the two elements are of sufficient area and are sufficiently close together, and the liquid has sufficient shear resistance that torque transmission and rotation of the driven element begin substantially immediately upon rotation of the driving element. When centrifugal force reaches a certain valve at a critical speed of the driven element, the spring-pressed pistons within the relief spaces yield, enabling the silicone oil to escape from between the rotary elements, until the area of contact of the liquid with the interfaces of the driving rotor and the driven element is so small that the torque force applied to the liquid per unit of area is so large that the liquid cannot transmit the torque required to maintain the driven element at the critical speed. When this occurs, slip increases, and quickly an abrupt change takes place in the silicone oil. The oil in shear breaks down, and its torque-transmitting capacity is abruptly reduced. Thereupon the driven element slows incrementally, permitting the springs again to overcome centrifugal force, and driving the oil against the driving rotor to give another impulse to the driven element. In this manner the speed of the driven element is maintained at the critical speed but gets no greater regardless of further increase in the speed of the driving rotor.

An object of the present invention is to provide a coupling of the foregoing type in which a predeterminable maximum output speed can be maintained regardless of variations of the driving speed above that predetermined speed. Another object is to provide a coupling which does not generate excessive heat. And by the same token, it is an object of the invention to provide a coupling of this type that does not waste energy through the generation of heat that must be dissipated to the atmosphere.

A further object of the invention is to provide a coupling of this type wherein there is a sharply critical speed for the driven element. Specifically, it is an object to provide a coupling wherein there is a continuous force yieldably urging the silicone oil at all times into the interface area between the driving and driven elements; and a further object is to provide such an arrangement in which the silicone oil is prevented from escaping out of the confined area. It is another object of the invention to provide a coupling of this kind providing a predesigned path of least resistance for the flow of the silicone liquid, toward the relief space, even when the oil has broken down under shear. In a broader sense, this object is to provide a coupling taking advantage of the fact that the silicone oil breaks down under excessive shear forces, but which prevents breakdown from rendering the coupling incapable of starting the driven elements, or of losing its torque-transmitting capaicty during operation. A further object is to provide a coupling of this type having optimum shape and position of the faces of the driving and driven elements, to accomplish the initial coupling and subsequent constant output speed.

A further object of the invention is to provide relief receptacles containing spring pressed pistons or plungers that are of relatively constant resistance and yet which are effectively sealed against escape of the coupling oil.

Further objects of the invention include arrangements for the construction and assembly of the coupling that are of particular advantage.

Other objects and advantages will appear from the description to follow.

In the drawings:
FIGURE 1 is an outside front elevation of the coupling;
FIGURE 2 is an outside edge view;
FIGURE 3 is a diametrical section taken along the line 3—3 of FIGURE 1;
FIGURE 4 is a medial section taken on the line 4—4 of FIGURE 2 showing the inner faces of one driving rotor section and one driven element section;
FIGURE 5 is a broken transverse section taken on the line 5—5 of FIGURE 4;
FIGURE 6 is an enlarged section similar to the upper part of FIGURE 5 but showing the cylinder assembly in section;
FIGURE 7 is an inside view of one of the driven element sections;
FIGURE 8 is an outer face view of one of the driving rotor components;
FIGURE 9 is a diametrical section through the cylinder sleeve and flexible diaphragm used in the liquid relief spaces;
FIGURE 10 is a view of a relief plunger; and
FIGURE 11 is an elevation of the mandrel upon which the driving rotor is assembled with one of the liquid seal means used therewith.

There are three principal components of this coupling: a driving rotor element 15, a rotary driven element 16, and viscous silicone oil in a liquid-receiving space 17 between the first two elements. The silicone oil is indicated at the top of FIGURE 5 but not elsewhere shown because of the difficulty of illustration. The silicone oil can be a methyl polysiloxane oil of within a viscosity range of about 10,000–1,000,000 cs., having the characteristic of breakdown under predetermined shear conditions. This liquid, in the high part of its viscosity range, which is preferred, is, under free conditions, a very sticky, slow-moving material.

The driving rotor 15 comprises a hollow mandrel 20 (FIG. 11 among others) that can be mounted on a driving shaft 21, that may, for example, be an extension on the crank shaft of an automobile, such as that presently used to receive pulleys for driving the fan belt, generator, and the like. The mandrel can be secured against rotation on the shaft by appropriate means such as a key, and held onto the shaft by a nut 22.

The mandrel 20 has a medial hexagonal portion 23, flanked by two portions 24, that in turn are flanked by reduced portions 25. The driving rotor itself is made up of two hollow, internally ribbed, round, identical components 26 and 27. Only one need be described in detail. Each of these elements has a hub portion that can fit over and be supported on the larger parts 24 of the mandrel; and each hub has a hexagonal recess 30 to fit over and half-way along the hexagon 23 on the mandrel. When the two sections 26 and 27 are thus oppositely mounted on the mandrel 20 in facing relationship, and secured together by screws 31, they are held non-rotatably onto the mandrel 20, forming a unitary driving rotor.

Each of the two rotor components 26 and 27 has a radial inner face 33, occupying a plane transverse to the axis of rotation. Outwardly from the surface 33, the rotor enlarges, providing an outwardly extending frusto-conical wall 35 that leads to another radial, transverse wall 36. Beyond the wall 36 the rotor has an inwardly extending frusto-conical surface 37. Its outer rim is in the form of a cylindrical surface 38. As will appear, the surfaces 36, 37 and 38 constitute the principal operating faces of the rotor. Preferably they are polished, and without contouring. The rotor can be made of die cast aluminum if desired on a steel mandrel, and such materials have proven satisfactory.

The driven element also is made up of two identical round housing components 42 and 43 connected together in facing relationship. Only one need be described. One of these is shown in FIGURE 7 and they are shown in assembled relationship in other views. The assembled driven element is rotatably supported on the mandrel portion of the driving rotor 15 by two ball bearings 45 and 46, the inner races of which are fitted on the reduced ends 25 of the mandrel up against the shoulders thereon. There are seals 49 on each side of each of the two ball bearings. One of them is shown partly broken away in FIGURE 11. It comprises a metal ring 50 against the shoulder on the mandrel. Next there is a ring 51 formed of spring metal with a Teflon annulus on one face, the Teflon being indicated at 52. The ring 51 is made somewhat conical in shape so that its outer rim is yieldingly urged outwardly (which is to the left in FIGURE 11) to engage the outer race of the ball bearings. A spring retainer ring 53 then engages the backing ring 51 within the inner diameter of the Teflon, to hold the ring 51 in place. The Teflon material acts as a sealing member that can withstand a large amount of wear. The principal purpose of the seals around the ball bearings is to prevent escape of the clutch oil when the device is inoperative, such as when it is on the shelf prior to its being installed in a vehicle.

The two driven element components 42 and 43 are placed back to back on the outer bearing races and are secured together by screws 60. They may be made of aluminum die castings appropriately finished so that they are accurate dimensionally. FIGURE 7 shows an inner face of the member 43. The casting illustrated in FIGURE 7 shows the center opening 65 to receive the mandrel and a circular recess 66 into which the ball bearing fits. Radially outwardly from this recess there is a wall 67 that is adapted to lie adjacent the wall 33 of the driving rotor. From the outer edge of the wall 67 there extends a frusto-conically shaped wall 68 adapted to lie adjacent the conical wall 35 of the driving rotor. Outwardly from the wall 68 there is the radial wall 69 adapted to lie alongside the wall 36 of the rotor. Outwardly from the wall 69 there is a conical wall 70. The wall 70 is approximately complementary to the wall 37 of the driving rotor. Actually these two walls diverge outwardly with a small angular difference, such as from 1° to 2°. As a result the liquid space 17 between the driving rotor 15 and the driven element 16 increases in size outwardly.

The conical wall 70 terminates outwardly in a radial wall 71.

The conical surface 70 and the radial surface 71 are interrupted by a plurality of recesses, details of which will be described hereafter.

Beyond the surface 71 the driven element casting 43 has a radial surface 72. The surface 72 has a plurality of semi-cylindrical recesses 75 therein. These recesses terminate short of the outer periphery. When the two halves of the driven element are placed together, the semi-cylindrical recesses 75 on the two elements are complementary and form cylinders that are closed at their ends by the walls 77 on the two elements. The walls 77 are penetrated by recesses forming openings 79.

The radial wall 72 on each element is provided with a groove 80, which actually comprises a series of connected groove portions, into which sealing strips may be located. The groove 80 extends into the semi-cylindrical recesses 75. The sealing strips will be described hereafter.

Each of the cylinders 75 receives an open ended cylindrical sleeve 83. The sleeve has sealed to its inner end a rubber diaphragm 84. The diaphragm normally assumes the position illustrated in FIGURE 9. Each cylinder 83 also receives a piston 86, with a reduced inner end 87 having rounded corners. Each piston is hollow, having a spring receiving inner recess 88 as illustrated in FIGURE 6. A coil spring 89 of predetermined strength is inserted into the recess 88 of the piston 86 and engages against the top wall 77 of the cylinder, so as normally to urge the piston 86 radially inwardly. The cylinder has a ridge 90 around it that may be formed by turning the cylinder against a tool held against its outer surface. This inwardly extending ridge constitutes a limiting abutment for movement of the piston 86 under action of the spring 89. The diaphragms 84 seal the space 17 for the oil and prevent escape of the oil past the pistons 86.

When the two components 42 and 43 of the driven element are fastened together by the screws 60, appropriate sealing strips 92 are located in the arcuate portions of the grooves 80 and other like strips of sealing material such as O-ring material 93 are disposed in the portions of the grooves around the outside of the cylinder sleeves 83. The sealing strips are such that the liquid cannot escape between the components 42 and 43, or around the outside of the cylinders 83.

Reference has previously been made to recesses cut out in the conical wall 70 and the radial wall 71. Rectangular recesses 96 are cut out so that they may form a free entrance for the liquid into the cylinders 83 to engage the inner surfaces of the diaphragms 84 and act upon the pistons 86. The square side edges of these recesses 96 have a further function as will be described. Angularly located between the entrance recesses 96 are additional generally half circular recesses 98. These are preferably of approximately the same depth into the casting as the recesses 96, and have flat bottom walls transverse to the axis of the rotating parts. These recesses present sharp-edged walls to the torque-transmitting liquid, when the rotor is moving faster than the driven member. When the liquid begins to break down, as will be described, these edges speed the collapse and make the critical speed sharper.

The castings have transverse openings 99 that are designed to receive the screws 60. One or more of these screw openings 99 may be connected by a radial groove 101 into the liquid area 17. These openings are ultimately closed by the screws 60.

The outer peripheries of the driven element components 42 and 43 are provided with grooves 105 and 106 to receive belts or other like elements to transmit force. Of course, other direct or indirect means for connecting the driven elements to a device to be rotated may be used.

On the outside of the elements 42 and 43 somewhat tangential fins 107 may be disposed. These fins can constitute heat transmitting elements and also they can cause circulation of air to carry heat away from the unit.

The assembly of the unit should be fairly obvious. The driving rotor is assembled by securing the two appropriately machined castings 26 and 27 together about the mandrel 20. The sealing elements 49 and the bearings 45 and 46 are put in place; and the appropriately machined housing sections 42 and 43 are placed outside the bearings to enclose the driving rotor. The parts are finished to give the right tolerances.

For illustration, with a coupling having a seven-inch outer diameter of the housing, the rotor may have a maximum diameter of about 5.125 inches. The walls 33 and 67 should be in contact with a close fit, as should the walls 35 and 68. The diameters of the wall 35 are about .020 inch less than the diameters of the wall 68. The spacing between the radial walls 36 and 69 for the previously mentioned size of device can be approximately .016 inch. This clearance would also apply at the diameter of the walls 37 and 70 adjacent the walls 36 and 69; while as noted these walls diverge from 1° to 2° radially outwardly.

The foregoing representative dimensions confine the liquid to the space between the surfaces 36 and 69 and radially outwardly therefrom. The fact that the liquid space is larger between the walls 36 and 69 than between the walls 35 and 68, plus the fact that the space enlarges outwardly, causes the liquid to seek escape outwardly, and not inwardly toward the axis. As noted, any liquid that does escape inwardly during the standing of the device on the shelf is prevented from leaking out through the bearings by the seals 49.

It has been found that there should be an angle to the surfaces 37 and 70. Approximately 60° to the axis is satisfactory for all sizes of coupling but this may be varied approximately 20° either way from the 60° value. As the space becomes more nearly radial or perpendicular to the axis of rotation, the required size of the relief space within the cylinders 83 is increased.

As noted the silicone liquid may be a methyl-polysiloxane, such as the General Electric methyl-polysiloxane oils which are 100% silicone, or the Dow-Corning 200 methyl-siloxane oil series. It should have a viscosity of at least about 10,000 centistokes and preferably much higher. Five hundred thousand to one million centistokes silicone oils have been found particularly satisfactory.

Such viscous material requires a great deal of pressure to force it into the equipment when the coupling is being charged. Approximately four ounces by volume are used in the seven-inch size of coupling previously mentioned. This will normally cause the spaces between the interfaces 36 and 69, 37 and 70, to be fully covered with the oil, when the pistons 86 are all inward. With such arrangement springs of fifteen pounds per inch rate, acting on ¾ inch pistons, will cause the coupling to have a critical speed of about 1900 r.p.m.

In order to eliminate air from the liquid space 17, the driving rotor is set into rotation during the liquid charging before the screws 60 are tightened in the holes 99 that are provided for exhausting the liquid space by way of the grooves 101. Centrifugal force drives the air out, and as soon as liquid appears, the screws are tightened, thereby sealing the device. In this action the driven element may be held against rotation and the speed kept below the critical speed.

*Operation*

The coupling finds a particularly valuable use on the crank shaft of a motor vehicle where it can be used to drive the generator, water pump, radiator fan, air conditioner compressor, and the like, that are driven from the engine shaft, usually by belts. Another use of note is the use between a prime mover and an alternator. The constant maximum output speed of the coupling, regardless of variation in speed of the prime mover, and regardless of torque, makes it possible to drive the alternator at a constant speed and thereby to obtain a constant frequency therefrom.

For illustration of the operation of the coupling, the description to follow shall be related to its use on a motor vehicle. The shaft 21 may represent the forward end of the crank shaft of the vehicle. The mandrel 20 is keyed or otherwise secured thereto. With such arrangement, the rotor 15 is caused to rotate with the shaft by virtue of the hexagon interconnection between the mandrel and rotor elements.

At the start, the viscous liquid within the narrow space 17 between the interfaces of the driving and driven elements, transmits substantially all of the torque of the driving rotor 15 to the driven element 16 so that it rotates with almost zero slip. This is in contrast to the familiar liquid coupling for the conventional torque convertor, in which the slip is maximum at low speeds. It is to be noted that, at the start, the liquid fills the liquid space, and is preferably under some pressure from the springs 89. Therefore there is always a supply of liquid between the entire interfaces of the driving and driven elements. The area of the interfaces and the distances between them are designed to be sufficient to cause the liquid to have adequately low unit shear force applied to it, to enable it to transmit the maximum torque load applicable in the given installations; and the coupling starts with enough liquid between enough interface area to cause the driven element to start under maximum load. The coupling does not depend on distributing the liquid by initial rotation of the driving element.

With the foregoing start of the engine shaft, the driven element and the accessories connected to it rotate substantially at driving shaft speed, from the start. When the driving shaft speed reaches a predetermined rate, centrifugal force, including primarily that acting on the diaphragm and pistons, becomes sufficient to cause the liquid, contacting the inner surface of the diaphragms 84, to follow the diaphragms 84 and pistons 86 outwardly against their springs 89. As the liquid leaves the interfaces between the driving rotor 15 and the driven element 17, the torque transmitting capacity of the device is reduced; and finally, the escape of the oil into the driven element 16 and away from the driving rotor 15 reaches such an extent that there does not remain enough oil between the interfaces to keep the driven element rotating without a greater degree of slip.

At the time of this increase in slip, the second characteristic of the viscous silicone oils have above mentioned comes into action. These oils break down under excessive shear loads. Hence, when the torque demand exceeds the torque transmitting capacity of the coupling, and slip is substantially increased, the silicone oil breaks down and its torque transmitting capacity is very suddenly and sharply reduced. While the action is not precisely known to the applicant, it appears that the oil breaks down into small ball-like particles that are not only reduce the torque transmitting capacity of the oil, but actually causes it to act in some respects like a lubricant.

Once the silicone is expelled into the relief spaces within the cylinders 83 and is no longer between the interfaces of the driving and driven elements, it is no longer under shear, and can again return to its liquid state.

In all of the foregoing action, pressure is exerted upon the liquid by the springs 89, which tends to force it back toward the driving rotor 15. The result of its escape from the driving rotor causes an incremental retardation of the driven element and concomitant reduction in centrifugal force, whereupon the springs once again force the liquid back toward the driving rotor 15. The liquid then is forced into contact with the outer rim 38 of this driving rotor and perhaps the conical surfaces adjacent thereto, and gives another increment of drive to the driven element, followed by another breakdown of the liquid and its expulsion to the relief spaces. It appears that there is, therefore, a cycling of the liquid back and forth from the rim 38 to the relief spaces, accompanied by a change of its state, and that such cycling is the mechanism by which the driving rotor causes the driven element to be rotated at a fixed maximum output speed.

In this, the force of the springs 89, opposed to the centrifugal force of the pistons, sets the constant maximum output speed for the output or driven element 16.

If the load becomes greater, the critical speed is not changed but the rate or frequency of each cycle of the oil away from and back to the rim 38 of the driving element may be increased. With increased load, the incremental slow-downs of the driven element would be more rapid than for the relatively light load.

With this type of arrangement, in contrast with a conventional impellor type of liquid coupling, there is little generation of heat. Perhaps this results from the fact that the amount of liquid in action at the critical speed is only enough to insure that the critical speed will be maintained. Also the facts that this coupling operates on the coupling effect between two smooth surfaces of a viscous silicone oil, and also on the breakdown characteristic of silicone oil which causes the friction to be reduced at above the critical amount of slip, appear to reduce the amount of heat generated.

It is necessary that there always be a means to maintain a force or pressure on the liquid as soon as the liquid seeks to escape by centrifugal force. The means in the present case is illustrated by the springs 89 acting against the pistons 86 and the diaphragms 84. We may also note that the structure of the rubber diaphragms 84 and their arrangement with the pistons 86 reduces the friction of the pistons to a minimum, and yet prevents leakage of liquid.

When the breakdown of the silicone oil occurs as aforesaid, the particles of silicone seek to escape from the interfaces by the easiest free path and even can move inwardly against centrifugal force. For this reason, the radially inward interfaces between the driving rotor and the driven element, such as surfaces 35 and 68, are tight; and also it is for this reason that there is the divergence between the conical interfaces 37 and 70. With this shape of the parts, the easy path for the silicone material is outwardly toward the relief space within the cylinders 83.

If the silicone oil can escape radially inwardly, the coupling becomes erratic in operation, and in many installations becomes useless.

Heretofore efforts have been made to use silicone oil as a coupling oil, but such efforts have not succeeded in producing constant output speeds. In one proposal, which was designed to be a constant torque coupling, the liquid could move between a storage space near the hub of the driven element and a space between driving and driven disks. Such couplings cannot attain constant output speeds, and indeed have proved erratic in operation as constant torque couplings. One of their problems is that, since the silicone liquid will break down with increased slip or torque, the coupling may not be able to start under heavy loads. With no pressure maintained on the liquid in the outer peripheral groove, the slip may increase beyond the breakdown point of the liquid, whereupon it all escapes inwardly toward the reservoir. As soon as it breaks down, therefore, the torque transmitting capacity of the coupling is substantially eliminated, and it may rapidly decline to zero because the oil, after it breaks down, seeks any escape from confinement and thereby flees to the free area of the reservoir. Yet if the coupling be designed to transmit maximum torque under starting conditions, and hence to avoid liquid breakdown, it cannot permit silicone breakdown during its operation, and accordingly cannot operate as the present coupling does.

In the present equipment pressure is always maintained on the liquid. Other means of maintaining the pressure may be devised, but the present means has proven very satisfactory. As noted, the use of fifteen-pound springs in the equipment of the size mentioned as illustrative, produces a critical speed of 1900 r.p.m. This critical speed will be maintained within plus or minus 10 r.p.m.

In any given coupling the critical speed can be varied very simply by changing the loading on the springs 89, or the weight of the pistons 86, or both. Couplings can be made in various sizes. Various shapes and contours of the interfaced surfaces have been tried, but it has been discovered that the best results are obtained when the surfaces are highly polished, as opposed to knurled or otherwise roughened shear surfaces.

One of the features of the present coupling is that it is in complete balance during operation. All of the reciprocating parts reciprocate radially, the liquid is evenly distributed about the periphery, and there are no unbalanced forces.

The value of this equipment can be understood when it is realized that most of the rotated accessories in an automobile are operated very inefficiently by being continuously connected to the crank shaft. A generator should be able to generate some potential even at relatively low speeds. But since it is under direct coupling to the engine, it must also operate at very high speeds. Typically the generator is caused to operate at about twice the speed of the crank shaft. This means that at highway speeds, the generator is turning at about 8000 or more r.p.m., which causes very high bearing loads. It is a frequent occurrence to have generator bearings burned out during long periods of highway driving. With the present equipment, the generator speed can be set so that it actually charges the battery at idling speeds, and yet operates only up to a certain modest speed, regardless of high vehicle speeds.

In connection with the radiator fan, the horsepower required to turn the fan alone may run from fifteen to thirty horsepower at high speeds, at which time the fan is wholly unnecessary. Actually the fan is required only when the vehicle is operating at speeds below about thirty miles an hour. With the present arrangement, the fan can be set to operate efficiently at idling speeds or city-driving speeds up to twenty-five or thirty miles an hour and thereafter to rotate no faster.

An automobile air conditioner requires a compressor. One of the serious problems with the compressor is that it must have sufficient capacity to produce adequate refrigeration to cool the car quickly at relatively low vehicular speeds. When the compressor is so set, it has serious over-capacity at highway speeds. One of the disadvantages of automobile air-conditioning systems, therefore, has been that an enormous capacity had to be provided for a small space and yet the equipment had to have very heavy bearings and great durability in order to withstand the effect of highway high-speed driving. With the present coupling, the compressor may be operated only up to a certain maximum speed and substantially all of the foregoing disadvantages can be eliminated. Smaller compressors can be used because they can be operated at higher speeds at low vehicular speeds. Smaller bearings can be used and the equipment made less expensive.

Not the least of the advantages of this type of equipment is the saving in fuel in the vehicle. With ordinary couplings that have maximum slip at low speeds and minimum slip at high speeds, there is a fuel loss because of the slip and because of the heat generated.

As noted heretofore, one of the uses of the present equipment is as a coupling between a variable speed prime mover and an alternator. With a constant maximum output speed the alternating current generator may be operated at a constant speed to produce a constant frequency. This use has a great potential, both in industry and in domestic application.

Various changes and modifications may be made within the process of this invention as will be readily apparent to those skilled in the art. Such changes and modifications are within the scope and teaching of this invention as defined by the claims appended hereto.

What is claimed is:

1. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient, so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being resistingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the elements having their generally parallel surfaces comprising base-to-base frusto-cones, and the rim comprises the portion of the driving element of maximum diameter, and wherein the driven element has the relief space outward of the rim.

2. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient, so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being restingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the elements having their surfaces in close contact radially inward from the conical surfaces, to restrain inward movement of the liquid when it has broken down.

3. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being resistingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the generally parallel surfaces on the elements sloping axially and outwardly, and the space between the surfaces on the two elements is greater outwardly than at the inner part thereof, whereby the liquid, in escaping from between the surfaces, has an easier path outwardly than inwardly.

4. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient, so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being resistingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the relief space in the driven element comprising a plurality of cylinders communicating with the liquid space between the elements, the cyclinders being disposed symmetrically about the periphery of the driven element; each cylinder having a flexible cup-shaped diaphragm of plastic material having its free edge sealed around the inner surface of the cylinder to be integral therewith; a piston in the cylinder outside the diaphragm, and resilient yieldable means urging the piston inwardly, to collapse the diaphragm.

5. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient, so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being resistingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the rotor element comprising a circular element having its outer surfaces converging outwardly to a rim, the driven element comprising a housing enclosing the driving element, and having surfaces substantially complementary to the aforementioned converging surfaces of the driving rotor; the relief space comprising a plurality of recesses in the driven element beyond the rim of the driving element, the recesses being symmetrically arranged around the element, and each having in it a yieldable force means normally reducing its size but yieldable to predetermined amounts of force to permit enlargement of its size and to apply force again to reduce its size.

6. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient, so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being resistingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the yieldable force means including a flexible diaphragm across each recess, and spring pressed means urging the diaphragm toward the axis of rotation.

7. A coupling comprising a driving rotor element, a rotary driven element, and a viscous liquid between them, the elements being mounted for rotation about a common axis; the two elements having generally parallel, facing surfaces, the surfaces being closely spaced and the viscosity of the liquid being sufficient, so that when the liquid occupies the space between the surfaces, rotation of the driving element will cause rotation of the driven element; the driven element having a relief space outward beyond the rim of the driving element and communicating with the space between the surfaces, means in the relief space maintaining the space small so as to maintain liquid between the facing surfaces during the start and at low speeds of the driven element; said means being resistingly yieldable at a critical speed to permit liquid to escape from the surfaces; the liquid being one that breaks down under excessive shear loads, so that when enough liquid has escaped into the relief spaces, unit shear forces in any liquid remaining between the surfaces cause the liquid to break down and abruptly reduce its shear-transmitting capacity; whereupon subsequent retardation of the driven element is accompanied by a return of liquid to the surfaces, by a consequent increment of torque to return the driven element to its critical speed, and then a repetition of the cycle; and the output speed of the driven element is kept at substantially the critical speed despite varying driving rotor speeds above the critical speed; the rotor comprising a pair of hollow parts and a mandrel, the parts and mandrel having non-circular complementary portions enabling the parts to be fitted non-rotatably onto the mandrel and secured together, the rotor having an inner part with outwardly extending walls, and an outer part with outwardly converging walls terminating in the rim; the driven element comprising a housing enclosing the driving element and having inner and outer wall parts conplementary to those of the driving rotor, the inner wall parts providing a close fit, and the outer wall parts diverging slightly from each other in an outward direction, to afford an easier fluid path outwardly than inwardly.

References Cited by the Examiner
UNITED STATES PATENTS

| | | |
|---|---|---|
| 923,565 | 6/1909 | Newcomb. |
| 1,868,245 | 7/1932 | Obermoser. |
| 2,015,626 | 9/1935 | Heath. |
| 2,182,076 | 12/1939 | Elmer. |
| 2,661,917 | 12/1953 | O'Connor et al. |
| 2,738,048 | 3/1956 | Douglas _____ 192—58 X |
| 2,792,095 | 5/1957 | Sherman. |
| 2,926,546 | 3/1960 | Paulsen. |
| 2,954,857 | 10/1960 | Palm. |
| 2,985,272 | 5/1961 | Sivacek. |
| 3,007,560 | 11/1961 | Weir. |
| 3,011,607 | 12/1961 | Englander. |
| 3,059,745 | 10/1962 | Tauschek. |

FOREIGN PATENTS 534,492  10/1955  Italy.

DON A. WAITE, *Primary Examiner.*

THOMAS J. HICKEY, DAVID J. WILLIAMOWSKY,
*Examiners.*